REDUNDANCY TRANSISTOR TRIGGERING CIRCUITS

Filed July 11, 1960 3 Sheets-Sheet 1

INVENTORS:
Robert J. Grady
Eugene P. Hoyt
LeRoy P. Scharfeld

By Smyth, Roston & Pavitt
Attorneys.

REDUNDANCY TRANSISTOR TRIGGERING CIRCUITS

Filed July 11, 1960 3 Sheets-Sheet 2

INVENTORS:
Robert J. Grady
Eugene P. Hoyt
LeRoy P. Scharfeld
By Smyth, Roston & Pavitt
Attorneys.

REDUNDANCY TRANSISTOR TRIGGERING CIRCUITS

Filed July 11, 1960 3 Sheets-Sheet 3

INVENTORS:
Robert J. Grady
Eugene P. Hoyt
LeRoy P. Scharfeld
By Smyth, Roston & Pavitt
Attorneys.

United States Patent Office 3,117,237

Patented Jan. 7, 1964

3,117,237

REDUNDANCY TRANSISTOR TRIGGERING CIRCUITS

Robert J. Grady, Los Angeles, Eugene P. Hoyt, Arlington, and Le Roy P. Scharfeld, Santa Monica, Calif., assignors to The Magnavox Company, Los Angeles, Calif., a corporation of Delaware Filed July 11, 1960, Ser. No. 41,817
13 Claims. (Cl. 307—88.5)

This invention relates to transistor circuits and, more particularly, to transistor trigger circuits of high reliability.

There are many applications in which the utilization of circuits having a relatively long error-free life is desirable, and there are some applications in which the utilization of such circuits is mandatory. For example, in space vehicles and satellites which travel over long periods of time, the communication and other electronic equipment should operate correctly for long periods of time. As another illustration, the usefulness of digital computers depends greatly upon the component and circuit reliability because inaccurate results may be provided due to a component or circuit failure.

Due to manufacturing tolerances and deterioration with time, the parameters of the various components in any circuit vary. In fact, even if used below the manufacturer's ratings, a percentage of the components fail prematurely either shorting or becoming open-circuited or drifting outside manufacturing tolerances. For these reasons, computers generally include checking facilities both for the computer components and for the computer circuitry. As to circuit reliability, the major problem is due to the non-uniformity and instability of component parameters. To improve the reliability of such circuits, entire circuits and portions of circuits are often duplicated. For example, two complete computers may be operated in parallel so that if either fails a correct computation is still provided. The smaller the portion of the circuit which is redundant or functionally duplicated, the greater the improvement in reliability. Component redundancy is provided if each component is functionally duplicated so that if any component fails the circuit is still operable. Component redundancy provides for the greatest reliability because the components are the smallest finite portions of the circuit.

In specific illustrative embodiments of this invention, trigger circuit arrangements are provided in which the redundancy is essentially on a component basis. The arrangements are, accordingly, highly reliable and, in fact, the reliability of each arrangement is equivalent to the reliability of a single resistor for a period of one year. The specific illustrative embodiments include a bistable arrangement, a monostable arrangement and an astable arrangement. Each of the arrangements includes two groups of four transistors having emitter-to-collector paths connected in a series parallel arrangement. Only one of the two groups of transistors is conductive at one time, and each of the transistors in each group is separately controlled by individual circuits coupled to the respective base electrodes of the transistors. The components in the base circuits are serially redundant to prevent overloading the circuits driving the circuit trigger arrangements in the event a component becomes short-circuited. Parallel redundancy of the base circuit components or of the base biasing circuitry of each transistor is unnecessary because the four transistors themselves in each group are operated in parallel. The collector biasing resistor means, however, in each of the groups in each arrangement is in the form of a series parallel arrangement of four resistors which is referred to herein as a resistor quad. A variation in characteristics of any component, including the transistors, from a direct short to an open circuit does not affect the operation of the circuit arrangements.

Features of this invention relate to the provision of a circuit arrangement in which three terminal components such as junction transistors are utilized in a redundant connection so that a failure or change in characteristic of a transistor does not affect the operation of the circuit arrangement.

Each of the bistable, monostable and astable circuit arrangements includes the two groups of four transistors connected in an arrangement referred to herein as a transistor quad. Each of the transistor quads includes four transistors having their collector-to-emitter paths connected in a series parallel circuit connection. The transistor quad functions as a switch to provide either a high or a low impedance path. The failure of any one of the four transistors in the quad does not affect its switching operation.

Further features of this invention pertain to the provision of a diode in the base circuit of each of the transistors of the transistor quad. When a transistor is conductive, the associated diode in the base circuit provides for a small voltage drop in series with the base-to-emitter potential so that the total voltage across the diode and the base-to-emitter junction is greater than the turn-on collector-to-emitter voltage. The diode in the base circuit of each of the transistors, therefore, prevents its associated transistor from turning on due to the transistor serially connected therewith becoming shorted or saturated. The base diode also functions to isolate the base circuitry from the transistor in the event of a collector-to-base short in the transistor. If the diode is not utilized, feedback paths are provided to the other transistors to prevent their proper operation.

Further features of this invention relate to the provision of the diode coupled to the base of each transistor which has a relatively long recovery time compared to the associated transistor. The transistor, accordingly, turns off before the diode. The diode remains conductive for a brief interval after its associated transistor becomes nonconductive so that minority carriers in the transistor are readily removed. Base storage effects in the transistor do not, accordingly, degrade the high speed performance.

Still further features of this invention pertain to the provision of redundancy circuitry in the monostable and astable arrangements which maintain the same output pulse duration with any component failure.

Further advantages and features of this invention will become apparent upon consideration of the following description when read in conjunction with the drawing, wherein.

Figure 2:
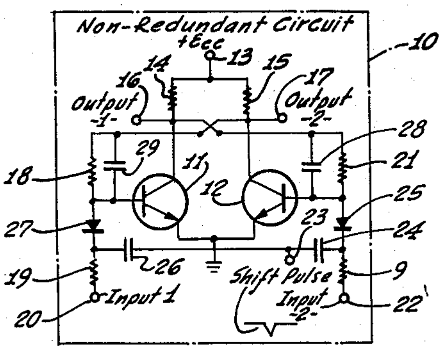
FIGURE 2 is a circuit representation of a non-redundant bistable circuit which is the basis for the redundant bistable circuit of FIGURE 1.

Referring first to FIGURE 2, a non-redundant bistable circuit 10 is shown which has two transistors 11 and 12. One of the two transistors 11 and 12 is conductive and the other is non-conductive at any time, and the transistors 11 and 12 remain in their respective conductive conditions until triggered to their opposite conditions.

The transistors 11 and 12 are NPN junction transistors having their emitter electrodes connected to ground and their collector electrodes biased by a source 13 coupled respectively thereto through the resistors 14 and 15. The source 13 also is utilized to bias the base electrodes of the transistors 11 and 12 being coupled through the resistors 15 and 18 to the base electrode of the transistor 11 and through the resistors 14 and 21 to the base electrode of the transistor 12. The resistors 18 and 21 are shunted respectively by the capacitors 29 and 28. The base electrodes of the two transistors 11 and 12 are also coupled respectively to two inputs 20 and 22 through gating arrangements including respectively the diodes 27 and 25. The diode 27 is coupled between the base electrode of the transistor 11 and a resistor 19 which is connected to the terminal 20, and the diode 25 is coupled between the base electrode of the transistor 12 and a resistor 9.

The circuit 10 may be one of a number of similar circuits in a shift register, not shown, with its output terminals 16 and 17 being connected to the next succeeding similar circuit in the register and its input terminals 20 and 22 being connected to the next preceding similar circuit in the register.

Assume that the transistor 11 is initially conductive and that the transistor 12 is nonconductive. Assume also that the preceding or input circuit, not shown, provides a zero potential to terminal 20 and a positive potential to terminal 22. The input potential at the terminal 20 may be, illustratively, at zero volts and the potential at the input terminal 22 may be, illustratively, at plus 6 volts. The potential of the source 13 may also be at plus 6 volts. With the input terminal 20 at ground potential and the input terminal 22 positive, the diode 27 is forward biased and the diode 25 is reversed biased. The potentials at the input terminals 20 and 22 are insufficient to trigger the transistors 11 and 12 and are utilized to control the gates comprising the diodes 27 and 25, respectively.

A shift pulse to a terminal 23 functions to trigger the non-redundant circuit 10 in accordance with the biasing conditions at the input terminals 20 and 22. With the diode 27 forward biased, a negative pulse at the shift terminal 23 is coupled through a capacitor 26 and the diode 27 to the base electrode of the transistor 11. The negative pulse functions to sufficiently reverse-bias the emitter-to-base junction of the transistor 11 to cause the transistor 11 to become nonconductive. When the transistor 11 becomes nonconductive, the potential at its collector electrode increases and due to the coupling through the resistor 21 shunted by the capacitor 28, a positive potential is provided to the base-electrode of the transistor 12. The transistor 12, accordingly, becomes conductive.

If the potential conditions at the terminals 20 and 22 are reversed, the next shift pulse is provided through the capacitor 24 and diode 25 to reverse-bias the base-to-emitter junction of the transistor 12 and trigger the circuit 10 back to its original condition.

The circuit 10 is a non-redundant circuit because a failure of any one of the components in the circuit 10 may destroy its operation. For example, if one of the paths through either transistor becomes shorted or open-circuited, the operation of the circuit 10 is impaired.

Figure 1:
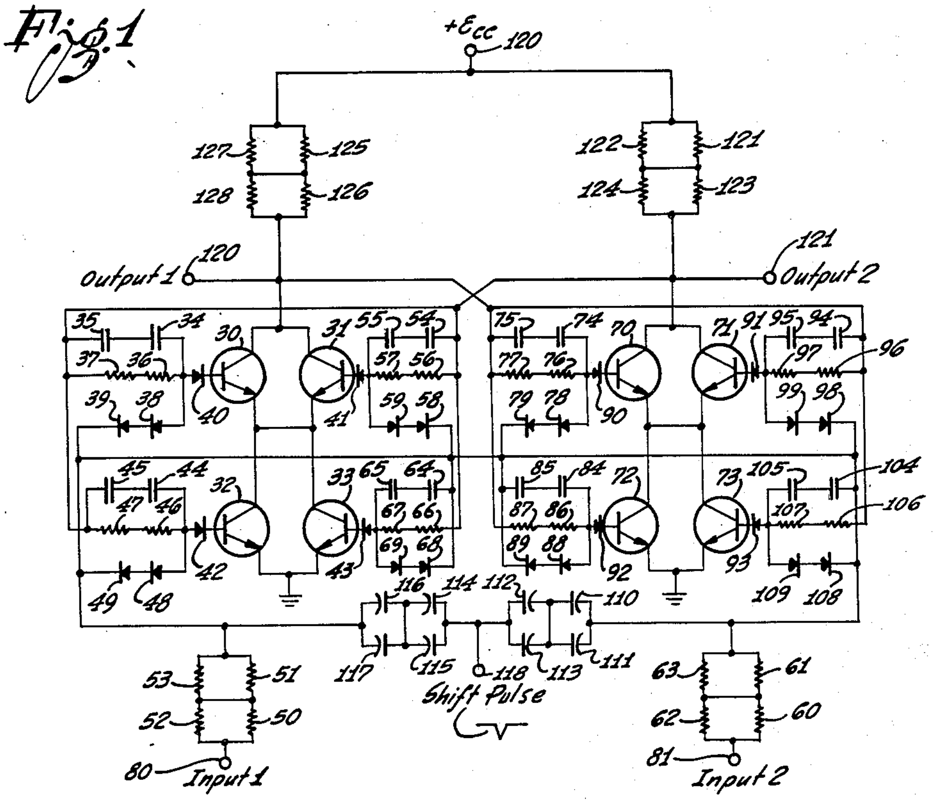
FIGURE 1 is a circuit representation of a redundant bistable circuit of this invention which duplicates the function of the bistable circuit of FIGURE 2 in a highly reliable manner.

The bistable circuit depicted in FIGURE 1 duplicates the functions of the non-redundant bistable circuit 10 shown in FIGURE 2 but in a considerably more reliable manner. The circuit reliability in fact is comparable to the reliability of a single resistor utilized in the circuit for a period of one year even though a relatively large number of components are utilized. The redundant bistable circuit includes two transistor arrangements each consisting of four transistors having their collector-to-emitter paths connected in a series parallel arrangement. These series parallel arrangements are refererd to as transistor quads. The transistors 30 through 33 are connected in one series parallel arrangement or transistor quad, and the transistors 70 through 73 are connected in a second series parallel arrangement or transistor quad. One or the other of these two transistor quads is conductive at any time. The two transistor quads are biased from a source 120 through resistor means consisting of the resistors 125 through 128 inclusive and the resistors 121 through 124 inclusive. Each of the resistor quads is a series parallel arrangement of four resistors each having the same value as the corresponding resistor in the non-redundant circuit 10 which the quad replaces. In the event one of the four resistors 121—124 becomes open circuited, the resistance presented by the quad changes from R to 1.5R. The redundant circuit in FIGURE 1 includes a number of resistor quads, and a change of resistance in the range 0.5R to 1.5R for each does not affect the operation of the redundant bistable circuit.

The resistor quads 125—128 and 121—124 are coupled respectively to the collector electrodes of the transistors 30 and 31, and 70 and 71. The joined or multipled emitter electrodes of the transistors 32 and 33 are connected to ground and the multipled emitter electrodes of the transistors 72 and 73 are connected to ground. The emitter electrodes of the transistors 30 and 31 are connected in common to the collector electrodes of the transistors 32 and 33, and the emitter electrodes of the transistors 70 and 71 are connected in common to the collector electrodes of the transistors 72 and 73. The transistor quads, accordingly, form the emitter-to-collector junctions of the four transistors in a series parallel arrangement.

The various components in the base circuits of each of the eight transistors in the bistable circuit are not quaded but are serially redundant. The reason for the serial redundancy is to avoid overloading prior circuits due to shorting of one of these components. Quadding is unnecessary because in the event of a failure in one of the base circuits, the associated transistor is effectively not operative and, due to the transistor quad, the bistable circuit maintains its effective operation. Each of the two transistors in the non-redundant circuit 10 is in this manner replaced by four transistors in the transistor quad, with each transistor having a separate, serially redundant, base circuit. A failure of any component in the base circuit or of any of the associated transistors does not affect the circuit operation of the redundant bistable circuit.

The two input terminals 80 and 81 are coupled respectively through resistor quads to eight diode gate in the base circuitry of the eight transistors 30—34 and 70—73 forming the two transistor quads. The resistor quad coupled to the input terminal 80 includes the resistors 50 through 53, and the resistor quad coupled to the input terminal 81 includes the resistors 60 through 63. In each gate, two serially coupled diodes are provided instead of a single diode in order to provide for the serial redundancy. The two diodes 39 and 38 are in the base circuit of the transistor 30, the two diodes 49 and 48 are in the base circuit of the transistor 32, and two diodes 59 and 58 are in the base circuit of the transistor 31, and the two diodes 69 and 68 are in the base circuit of the transistor 33. Similarly, the transistors 70 through 73 include the serially redundant pairs of diodes 79—78, 99—98, 89—88 and 109—108.

When the input terminal 80 is at ground and the input terminal 81 is positive, the diode gates associated with the four transistors 30—33 are enabled and the diode gates associated with the four transistors 70—73 are disabled. The various gate diodes 39—38, 49—48, etc., in the eight transistor base circuits are relatively fast diodes, that is, the recovery intervals are quite short. The recovery intervals may be comparable to those of the transistors 30—33 and 70—73. In addition to these diodes, each of the base electrodes is coupled to a relatively slow recovery diode. The diodes 40—43 are coupled respectively to the base electrodes of the transistors 30—33, and the diodes 90—93 are coupled respectively to the base electrodes of the transistors 70—73.

The diodes 40—43 and 90—93 perform a number of functions in the operation of the bistable circuit. First, they provide for an additional voltage drop of approximately 0.7 volt which is added to the voltage drop between the base and emitter electrodes of the transistors. The voltage drop from the anode of the diode to the emitter of the transistor is, accordingly, larger than the collector-to-emitter potential of each transistor when it is conductive. The serially connected collector-to-emitter paths may have a voltage difference across them greater than 1 volt. The diodes 40—43, etc., accordingly, respectively prevent the associated transistors 30—32 from automatically turning on when a serially connected transistor is on or when it is shorted. An input potential to the base circuit is, accordingly, necessary in order to cause the transistor to become conductive.

In addition to this function, the diodes 40—43 and 90—93 function to isolate the respective base circuits in the event of a collector-to-base short of the associated transistors. For example, if the collector-to-base junction of the transistor 30 becomes shorted, the diode 40 remains reverse biased when the transistors 31—33 are nonconductive. If the diode 40 were not utilized, the shorted path through the base-to-collector junction of the transistor 30 would provide for current through the diodes 38 and 39 to the resistor quads consisting of the resistors 50—53 and also from the transistor 30 through the resistors 36 and 37. These components are coupled to other similar components associated with the other transistors so that their operation would be effected. The diodes 40—43, etc., in this manner, function to prevent feedback or coupling between the transistor circuits associated with the transistor quad.

The diodes 40—43 and 90—93 are relatively slow, having relatively long recovery intervals to ensure that the associated transistors complete their change in conductive conditions before they do. In other words, when transistors 30—33 inclusive are turned off, they become nonconductive before the diodes 40—43 become non-conductive. In this manner, minority carriers from the transistors may readily be removed. If the diodes 40—43 would become nonconductive first, the paths for the minority carriers would be inhibited so that the switching of the transistors 30—33 would be substantially extended. In order to maintain the switching speed, the diodes are, accordingly, slow to recover relative to the recovery speed of the transistors. This does not interfere with the switching rates of the bistable circuit which is determined by the switching speeds of the transistors.

The collector electrodes of the transistors 70 and 71 are coupled to the base circuits of the transistors 30—33, and the collector electrodes of the transistors 30 and 31 are coupled to the base circuits of the transistors 70—73. In the base circuits, the components are serially redundant but not quadded. In each base circuit, the anode of the diode is connected to two serially connected resistors and two serially connected capacitors which parallel the two resistors. The resistors 37 and 36 and capacitors 35 and 34 are connected to the diode 40, the resistors 47 and 46 and capacitors 45 and 44 to the diode 42, the resistors 57 and 56 shunted by the capacitors 55 and 54 to the diode 41, and the resistors 67 and 66 shunted by the capacitors 65 and 64 to the diode 43. Similarly, the resistors 77—76, 97—96, 87—86, and 107—106 are coupled respectively to the diodes 90—93 and are shunted respectively by the capacitors 75—74, 95—94, 85—84 and 105—104.

If any resistor becomes open-circuited, the associated transistor is triggered over a path through the shunting capacitors. If a resistor shorts, the serially connected resistors prevent overloading the prior arrangement, not shown, coupled to the inputs 80 and 81. A failure of any component in the base circuit can only affect the operation of the associated transistor, and therefore does not affect the overall circuit operation.

To trigger the circuit, a shift pulse is applied to the input terminal 118. The shift pulse is coupled through two capacitor quads to the eight diode gates described above in reference to the base circuitry. One capacitor quad includes the capacitors 114—117 connected in a series parallel arrangement and the other quad includes the capacitors 110—113 connected in a series parallel arrangement. In this manner, the redundant circuit provides for the same overall function as does the non-redundant circuit in FIGURE 2 but in a very highly reliable manner.

Figure 5:
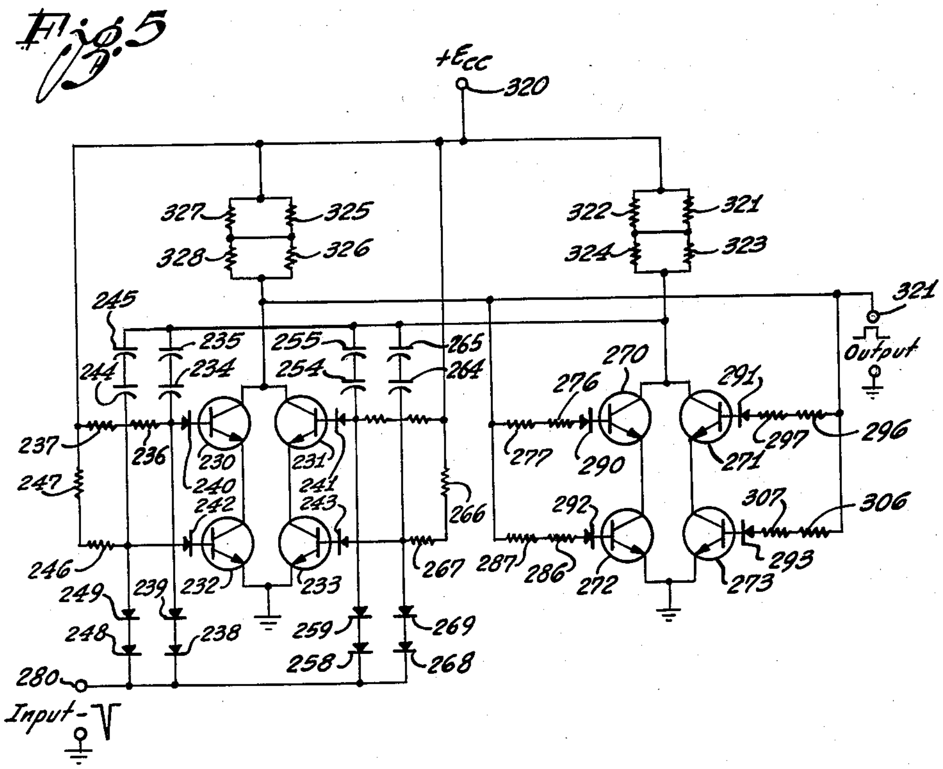
FIGURE 5 is a redundant monostable circuit of this invention which duplicates the function of the non-redundant monostable circuit of FIGURE 6 in a highly reliable manner.

The redundant circuit shown in FIGURE 1 is bistable. FIGURE 5 illustrates a redundant monostable circuit which provides an output pulse having a predetermined duration responsive to a trigger pulse at its input terminal 280. The output pulse duration remains the same in the presence of a component failure either shorting or open circuiting. The redundant monostable circuit performs the same function as the non-redundance circuit 210 in FIGURE 6 but in a highly reliable manner. The various components in FIGURES 5 and 6 have been given reference designations similar to corresponding components in FIGURES 1 and 2 except for the addition of 200. For example, the non-redundant circuit 210 in FIGURE 6 includes two transistors 211 and 212 whereas the non-redundant circuit 10 in FIGURE 2 includes two transistors 11 and 12.

The non-redundant circuit 210 provides for an output pulse of predetermined duration at its terminal 216 responsive to the negative trigger pulse at its input terminal 220. The trigger pulse reverse biases a diode 227 in the base circuit of the transistor 211 to turn off the transistor 211 and to thereby turn on the transistor 212 due to the connection from the collector electrode of the transistor 211 through a resistor 221 and a diode 224 to the base electrode of the transistor 212. The transistor 212 remains conductive until a capacitor 229 coupled between the collector electrode of the transistor 212 and the diode 226 becomes charged. This causes the conductive conditions of the two transistors 211 and 212 to return to their normal conditions and terminate the positive output pulse at the terminal 216. Failure of any one of the various circuit components in the circuit 210 affects neither the output pulse duration nor the trigger operation itself. For example, if one of the two transistors 211 and 212 becomes shorted or open circuited across any junction, trigger operation is not effected.

In FIGURE 5 the redundant monostable circuit includes two transistor quads, one including the transistors 230—233 and the other including the transistors 270—273. The various components in the respective base circuits of the transistors are all serially redundant except for the diodes 240—243 and 290—293. A separate RC timing circuit is provided in each base circuit so that the failure of any resistor or capacitor does not affect the output pulse width from the redundant monostable circuit. The RC timing circuit, for example, in the base circuit of the transistor 230 includes the two serially connected capacitors 234 and 235 and the two serially connected resistors 236 and 237. The capacitors 234 and 235 are serially connected between the collector electrodes of the transistors 271 and 270 and the diode 240. The collector electrodes of the two transistors 270 and 271 are connected to four series capacitor arrangements, one for each of the four transistors 230—233 of the transistor quad. When the transistor quad, including the transistors 270—273, accordingly, becomes conductive, it changes the eight capacitors 234, 235, 244, 245, 254, 255, 264 and 265 so that, effectively four timing circuits are operated. A failure of any component in the timing arrangement merely affects its associated transistor and, therefore, does not affect the overall operation of the redundant monostable circuit.

The diodes 240—243 and 290—293 have a relatively long recovery time with respect to the transistors 230—233 and 270—273 so as not to degrade the high speed performance of the monostable circuit. The trigger pulse applied at the input terminal 280 is provided to four pairs of serially connected diodes in turn respectively connected to the base circuits of the four transistors 230—233. The diodes 238 and 239 are connected to the diode 240, the diodes 248 and 249 are connected to the diode 242, the diodes 258 and 259 are connected to the diode 241, and the diodes 268 and 269 are connected to the diode 243. These input diodes are in series so that one shorted diode does not affect the performance of any of the transistors 230—233 of the transistor quad.

Figure 3:
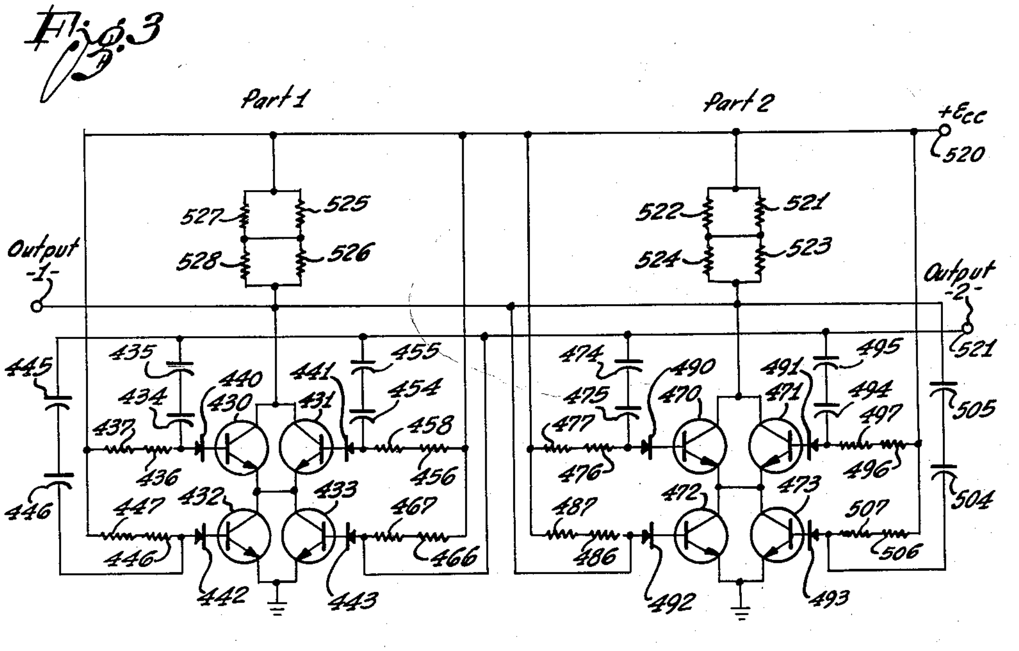
FIGURE 3 is a redundant astable circuit of this invention which duplicates the function of the astable circuit of FIGURE 4 in a highly reliable manner.
Figure 4:
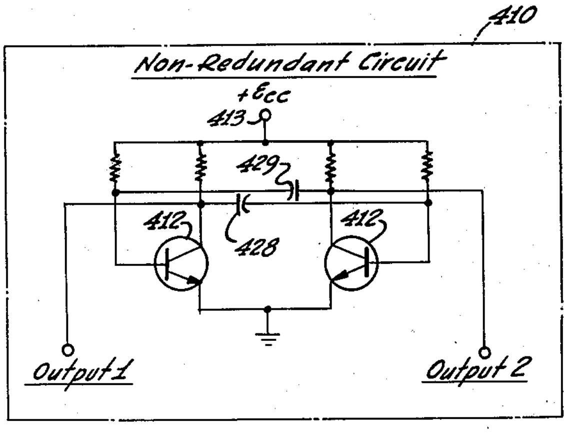
FIGURE 4 is a circuit representation of a non-redundant astable circuit which is the basis of the redundant astable circuit of FIGURE 3.

As described above, FIGURE 1 is a redundant bistable circuit and FIGURE 5 is a redundant monostable circuit. FIGURE 3 illustrates a redundant astable or multivibrator circuit which oscillates at a constant frequency in a highly reliable manner. The failure of any component does not affect the multivibrator frequency. The redundant multivibrator circuit performs the same functions as the non-redundant circuit 410 depicted in FIGURE 4. The various components in FIGURES 3 and 4 are similar to the corresponding components in FIGURES 1 and 2 except for the addition of 400. For example, the transistors 430—433 in FIGURE 3 are similar to the corresponding transistors 30—33 in FIGURE 1.

Figure 6:
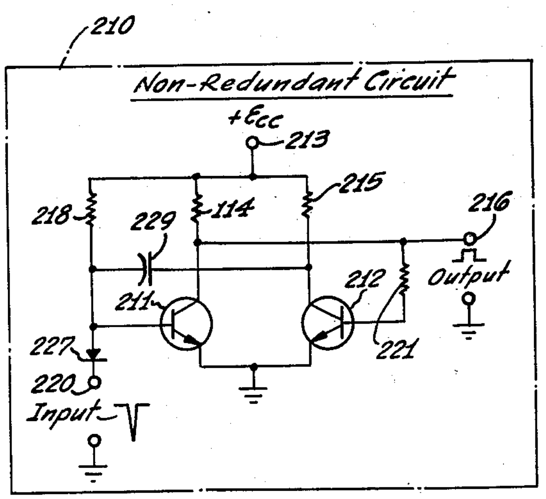
FIGURE 6 is a non-redundant monostable circuit which forms the basis of the redundant monostable circuit of FIGURE 5.

The astable circuit 410 is quite similar to the monostable circuit 210 in FIGURE 6 except that both collector electrodes of the transistors 411 and 412 are capacitively coupled to the base circuits of the other transistors whereas in the circuit 210, only one collector electrode is capacitively coupled. The capacitors 429 and 428 provide for this coupling. In the redundant astable circuit or multivibrator, the various components in the base circuit are serially redundant except for the diodes 440—443 and 490—493. Further, the RC timing circuits are provided in the base circuits of all eight transistors in the redundant circuit so that the failure of any component does not affect the multivibrator frequency. If one transistor of a transistor quad is out-of-phase with the other three transistors due to changes in its timing circuitry, it does not affect the overall operation of that transistor quad.

In this manner, the utilization of component redundancy for three terminal as well as two terminal components provides for a highly reliable trigger circuit. Further, with transistor quadding, the base circuitry may be serially redundant instead of quadded on a component basis without materially affecting the overall reliability of the circuit.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A trigger circuit, including, two input terminals for receiving input signals, two groups of four transistors, each of the transistors in each group having a base, an emitter and a collector and having conductive and non-conductive states, circuit means connecting the base of each of said four transistors in a first one of said groups to a particular one of said two input terminals and including at least one diode connected between the base of each transistor in said first group and the particular input terminal, the diodes connected between the bases of the transistors in the first group and the first input terminal being provided with a longer time constant for recovery than the transistors of the first group, biasing means coupled to the bases of each of said four transistors in each of said groups to bias the transistors to a particular one of the conductive and non-conductive states, means directly connecting the emitters of a first two of said transistors of each of said groups to each other and to the collectors of the other two of the four transistors in the same group, means directly interconnecting the collectors of the first two of the four transistors in each group, biasing means connected to the collectors of the first two of said four transistors in each group to bias the transistors to the state of conductivity, at least one output terminal connected to the collectors of the first two of said four transistors in said one group, circuit means connecting the base of each of said four transistors of the other group to the other of said input terminals and including a diode connected between the base of each transistor of the other group and the other input terminal, the diodes connected between the bases of the transistors in the other group and the other input terminal being provided with a longer time constant for recovery than the transistors of the other group, and circuit means connecting the base of each of the four transistors in each group to the collectors of each of said first of the transistors in the other group to produce a conductive state in the transistors of one of the groups and a non-conductive state in the transistors of the other group.

2. A trigger circuit in accordance with claim 1 wherein the circuit means interconnecting the bases of the transistors in one group to the collectors of the transistors in the other group includes a pair of resistors in series and the circuit means interconnecting the bases of the transistors in the other group to the collectors of the transistors in the one group includes a pair of capacitors in series.

3. The trigger circuit set forth in claim 1 in which the circuit means interconnecting the bases of the transistors in each group to the collectors of the transistors in the other group includes individual pairs of resistors in series and individual pairs of capacitors in series and in parallel with the pair of series resistors.

4. A trigger circuit, including, two transistor quads each including four transistors, each of the four transistors in each transistor quad having a base electrode, an emitter electrode and a collector electrode and having conductive and non-conductive states, means directly connecting the emitter electrodes of a first pair of the transistors in each quad to each other and to the collector electrodes of the second pair of the transistors in the same quad, a first plurality of diodes each directly coupled to the base electrode of a different one of the four transistors in a first one of the quads, a second plurality of diodes each coupled directly to the base electrode of a different one of the transistors in the second one of the quads, the diodes in the first and second pluralities being provided with longer recovery times than the transistors in the first and second quads, biasing means including the diodes coupled to the base electrodes of each of the four transistors in both quads to bias the transistors to the other one of the conductive and non-conductive states, and circuit means including the diodes coupling the collector electrodes of the first pair of transistors in each quad to all four base electrodes in the other quad to obtain a conductive state in the four transistors of one of the quads and a non-conductive state in the four transistors of the other of the quads.

5. A trigger circuit in accordance with claim 4 wherein said circuit means also includes individual pairs of serially connected capacitors for each different transistor of a particular one of the first and second quads and wherein the circuit means further includes means connecting each individual pair of capacitors between the collectors of the first pair of transistors of the other quad and the diode coupled to the base electrode of the transistor associated with said pair of capacitors in the particular quad.

6. A trigger circuit in accordance with claim 5 wherein said circuit means also includes individual pairs of serially connected resistors for each different transistor of the particular one of the first and second quads and wherein the individual pairs of serially connected resistors are in a particular relationship with the individual pairs of serially connected capacitors.

7. The trigger circuit set forth in claim 6 in which the individual pairs of series capacitors are in parallel with the individual pairs of series resistors.

8. A trigger circuit, including, two transistor quads each including four transistors, each of the four transistors in each transistor quad having a base electrode, an emitter electrode and a collector electrode and having conductive and non-conductive states, means directly connecting the emitter electrodes of a first pair of the transistors in each quad to each other and to the collector electrodes of the second pair of the transistors in the same quad, biasing means coupled to the base electrodes of each of the four transistors in both quads to bias the transistors in a particular one of the conductive and non-conductive states, biasing means coupled to the collector electrodes of the first pair of transistors in both quads to bias the transistors to the conductive states, and circuit means coupling the collector electrodes of the first pair of transistors in at least one quad to the base electrodes of all four transistors in the other quad to provide a state of conductivity in the transistors in one quad and to provide a state of non-conductivity in the transistors in the other quad, the circuit means including a pair of serially connected capacitors and a diode in series with the serially connected capacitors and having a longer time constant than the associated transistors.

9. A trigger circuit, including, two groups of four amplifying elements, each of the amplifying elements in each group having conductive and non-conductive conditions and having three terminals, means directly connecting a first one of the terminals of a first pair of amplifying elements in each group to each other and to a second one of the terminals of the other pair of amplifying elements in the group, biasing means coupled to the third terminal of each of the amplifying elements of each group and to the second terminals of the first pair of amplifying elements in each group for facilitating the operation of the amplifying elements in each of the two groups in a particular one of their conductive and non-conductive conditions, circuit means coupling the second one of the terminals of the first pair of amplifying elements in at least a particular one of the groups to the third ones of the terminals of all four amplifying elements of the other group to obtain an operation of the amplifying elements in one group in their conductive conditions and to obtain the operation of the amplifying elements in the other group in their nonconductive conditions, the circuit means including a different pair of capacitors in series with each individual one of the second terminals of the first pair of amplifying elements in the particular group and each individual one of the third terminals of the amplifying elements in the other group, and input means coupled to the third terminals of all four amplifying elements in at least one of the groups to introduce input signals to such terminals for triggering the amplifying elements in that one group to the other one of the conductive and nonconductive states.

10. The combination set forth in claim 9 in which four resistances are included in the biasing means and are connected in a series relationship of pairs of resistances and in a parallel relationship of pairs of resistances.

11. The combination set forth in claim 10 in which the input means includes individual diodes connected to the third terminals of the amplifying elements in the one group.

12. A trigger circuit in accordance with claim 11 wherein said circuit means also includes pairs of serially connected resistors connected in parallel with the individual pairs of serially connected capacitors.

13. The trigger circuit set forth in claim 12 in which the circuit means couple the second one of the terminals in the first pair of amplifying elements in each group to the third one of the terminals in the four amplifying elements of the other group.

References Cited in the file of this patent

UNITED STATES PATENTS 2,946,900 Steinman et al. ---------- July 26, 1960